June 20, 1933.  W. W. HARTLEY  1,914,855
BELT HOOK PRESS
Filed April 7, 1932
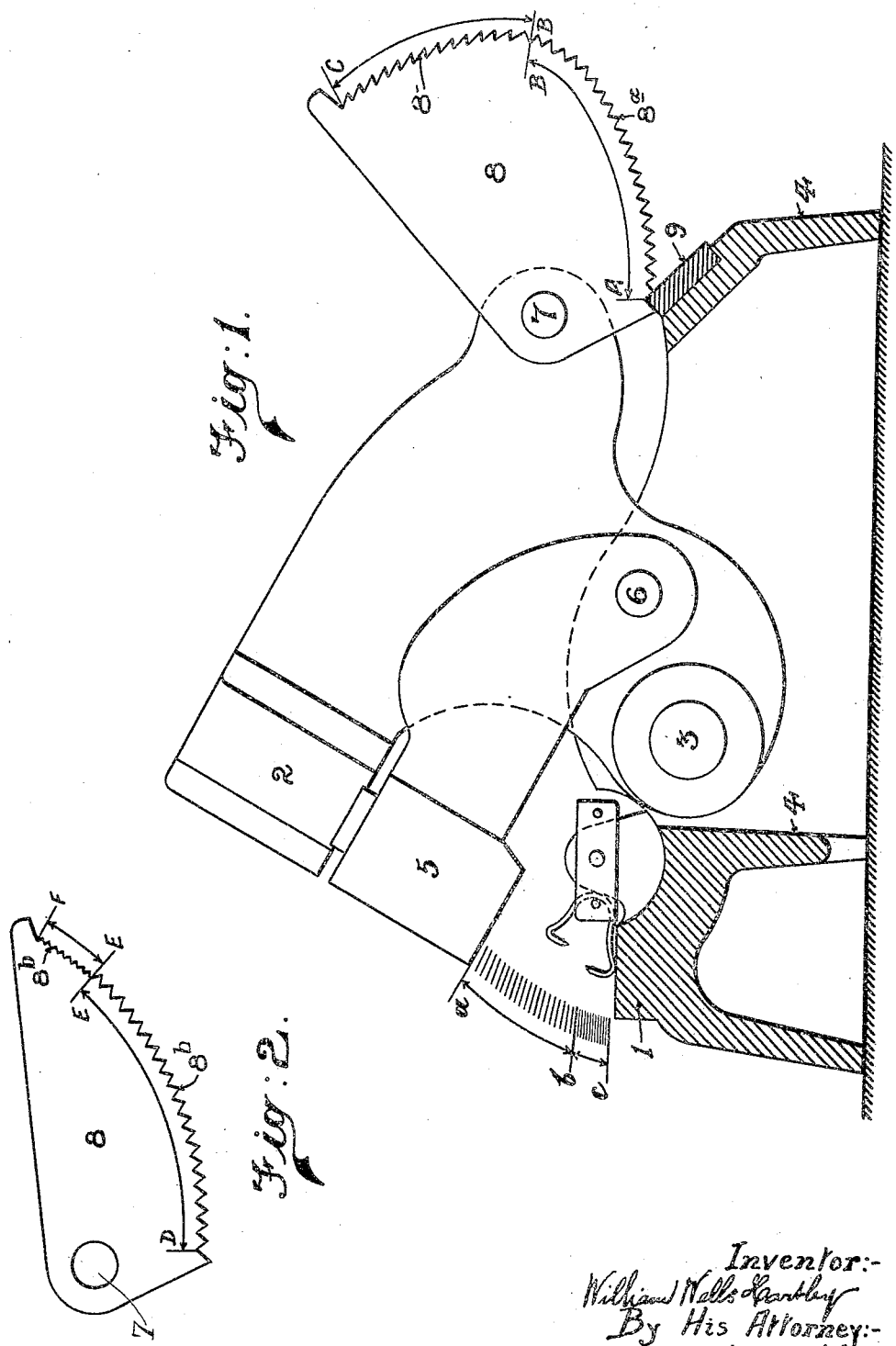

Patented June 20, 1933

1,914,855

UNITED STATES PATENT OFFICE

WILLIAM WELLS HARTLEY, OF MANCHESTER, ENGLAND, ASSIGNOR TO HENRY F. COCKILL AND SONS LIMITED, OF MANCHESTER, ENGLAND, A BRITISH LIMITED LIABILITY COMPANY

BELT HOOK PRESS

Application filed April 7, 1932, Serial No. 603,883, and in Great Britain February 10, 1931.

For the clinching of belt hooks into the ends of driving belts an apparatus is widely employed wherein a pivoted press head co-acts with an anvil on which the belt end is placed, the tail of the press head having freely pivoted thereon a rack sector having teeth upon its outer edge which teeth engage with a fixed detent. The rack sector swings upwardly as the press head is brought down towards the belting, and the detent holds the rack sector and thus the press head against the back-strain during the clinching. The teeth of the rack sector are however of regular and constant pitch and the minimum degree of adjustment of the press head towards the anvil is thus in ratio to the distance between the roots of adjacent teeth. Any greater degree of adjustment required is represented by a multiple of this distance.

It is desirable to adapt apparatus of this type to take thick and thin belting and for the latter the minimum degree of adjustment should be small without sacrificing the strength of the teeth of the rack at those parts of the latter where it engages with the detent for adjustment of the press head to the larger thicknesses of belting. The present invention is directed to the provision of an apparatus which will present this advantage and such invention consists in providing the rack sector with points for engagement by the detent which points—considered in relation to the path described by the sector rack as the sector moves around its pivot—vary in pitch on different sectors of such path.

The annexed drawing represents two embodiments of the invention by way of example and these will now be fully described for a full understanding of such invention. In the drawing Figure 1 is a side elevation partly in section of a belt hook press in which the contour of the edge of the rack sector is such that the points of adjustment engageable by the detent vary in distance as between one half and the other of such edge. This is a preferred form as the teeth of the sector rack are all of the same pitch or distance between centres. Figure 2 is a fragmentary showing of a rack sector having its toothed edge truly arcuate, that is to say it is struck from a single centre, the pitch of the teeth of the rack being varied for my purpose.

The general form of the press illustrated in Figure 1 is known; it has an anvil 1, a press head 2 pivoted at 3 in a frame 4 and—in this particular example—an upper jaw 5 which is pivoted at 6 upon the press head. The latter has pivoted thereto at 7 a rack sector 8 having teeth 8a which, as the jaw 5 descends, click over a fixed detent member 9. The variation of this sector from the known truly arcuate form is however the characteristic feature of the form of my invention now being described, and the variation and its purpose will be understood by a reference to the groups of adjustment points $a$ to $b$ and $b$ to $c$ indicated by lines between the upper jaw 5 and the anvil 1, and the corresponding groups or series of teeth A—B, B—C of the sector. From A to B on the latter the teeth 8a are of constant pitch and the arc between these points is struck from a given centre. The arc from B to C is struck from another centre, the teeth however being of the same pitch as those from A to B. The effect of this form is that as the jaw 5 is adjusted downwardly, the rack teeth click successively over the detent 9, but the successive adjustments of the jaw 5 for equal series of traverse of the rack are as shown by the adjustment lines, those indicated by $b$ to $c$, corresponding to the movement of arc B to C being much closer together than those from $a$ to $b$ corresponding to the arc A to B of the sector.

By selecting suitable contours for the sector 8 it will be seen that any variation of degree of adjustment of the jaw 5 can be provided for, and that in every case the variation adjustment can be obtained without sacrificing the strength and pitch of the sector teeth.

In Figure 2 the sector 8 is of truly arcuate form, the arc being struck eccentrically of the pivot point 7, but the teeth 8b are as will be seen divided into two sections D—E, E—F, the pitch of the teeth of section D—E being greater than that of the teeth of section E—F. The degree of adjustment of the upper jaw 5, in this embodiment of the invention corresponds to the pitch of tooth engaging with the detent 9. The tooth pitch may however be varied as desired to give varying adjustment of the upper jaw 5.

I claim:—

1. In a belt hook press a pivoted press head, an anvil, a rack sector freely pivoting upon the tail of the press head, and a detent engaging the rack sector, the contour of the engaging edge of the latter being formed on arcs struck from different centres.

2. In a belt hook press a pivoted press head, an anvil, a rack sector freely pivoting upon the tail of the press head, and a detent engaging the rack sector, the contour of the engaging edge of the latter being formed on arcs struck from different centres; and teeth of constant pitch upon the said edge.

3. In a belt hook press a pivoted press head, an anvil, a rack sector freely pivoting upon the tail of the press head, and a detent engaging the rack sector, the contour of the engaging edge of the latter being formed on an arc struck from a single centre; and teeth upon the rack, such teeth varying in pitch in different sections of the engaging edge.

4. In a belt hook press, the combination, with a pivoted press head, an anvil and a fixed detent, of a toothed sector having a plurality of tooth groups and pivoted on the tail of said head in position to engage said detent, the points of such engagement, considered in relation to the path described by the sector as it swings on its pivot, differing in effective pitch in different tooth groups, so as to advance the head through different minimum extents of adjustment.

In testimony whereof I have hereunto set my hand.

WILLIAM WELLS HARTLEY.